(12) United States Patent
Obara

(10) Patent No.: US 6,176,620 B1
(45) Date of Patent: Jan. 23, 2001

(54) COMPOSITE BEARING STRUCTURE

(75) Inventor: Rikuro Obara, Miyota-machi (JP)

(73) Assignee: Minebea Co., Ltd., Nagano-ken (JP)

(*) Notice: Under 35 U.S.C. 154(b), the term of this patent shall be extended for 0 days.

(21) Appl. No.: 09/259,255

(22) Filed: Mar. 1, 1999

(30) Foreign Application Priority Data

Mar. 2, 1998 (JP) .................................................. 10-049113

(51) Int. Cl.[7] ...................................................... F16C 21/00
(52) U.S. Cl. .............................................................. 384/127
(58) Field of Search .................................... 384/101, 102, 384/126, 127, 279, 624, 902

(56) References Cited

U.S. PATENT DOCUMENTS

| Re. 28,625 | 11/1975 | Cunningham . | |
|---|---|---|---|
| 3,301,611 | 1/1967 | Dunlap . | |
| 4,226,484 | * 10/1980 | Glassow et al. | 308/201 |
| 4,309,063 | * 1/1982 | Weis | 308/187.2 |
| 4,394,091 | * 7/1983 | Klomp | 384/127 X |
| 4,881,828 | * 11/1989 | Kato | 384/127 |
| 4,938,610 | * 7/1990 | Kato | 384/127 X |
| 5,046,863 | * 9/1991 | Sakatani et al. | 384/101 |
| 5,332,317 | * 7/1994 | Niwa et al. | 384/127 X |
| 5,806,988 | * 9/1998 | Dublin, Jr. et al. | 384/624 X |

FOREIGN PATENT DOCUMENTS

| 1464889 | 3/1967 | (FR) . |
| 1042549 | 8/1965 | (GB) . |
| 1382037 | 1/1975 | (GB) . |
| 10-064002 | 6/1998 | (JP) . |

\* cited by examiner

*Primary Examiner*—Dirk Wright
(74) *Attorney, Agent, or Firm*—Staas & Halsey LLP (57) ABSTRACT

A composite bearing which provides an outer ring and an inner ring arranged coaxially to provide a gap relatively fixed to one of the opposing parts of the bearing, ball grooves in the opposing surfaces of said inner ring and outer ring, balls which can rotate freely in said grooves, the bearing being arranged on outer ring and inner ring and balls, but at least on one side of balls, which is cylindrically-shaped and has an outer surface fixed to an outer ring sleeve, and an internal surface having a bearing part (inner ring) and a friction bearing which maintains gap g to within the specified value for the permitted range of inclination for inner ring and outer ring.

19 Claims, 10 Drawing Sheets

COMPOSITE BEARING STRUCTURE

BACKGROUND OF THE INVENTION

1. Field of the Invention

The present invention relates to a composite ball bearing which and more particularly to a composite bearing structure is a combination of a single row ball bearing and a cylindrical bearing.

2. Description of the Prior Art

Figure 17:
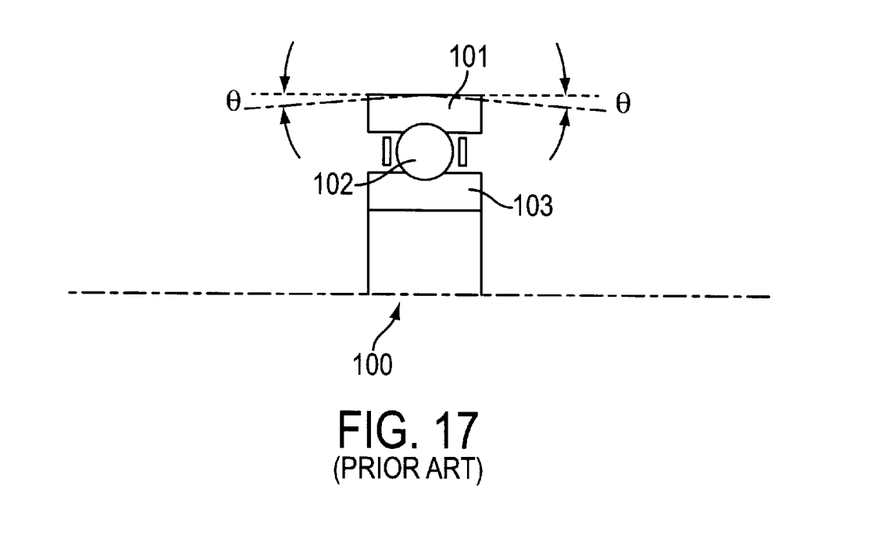
FIG. 17 is a sectional view showing a conventional ball bearing.

Single row ball bearings are simple in construction and low cost, and are therefore widely used for the bearings in the rotational support mechanism of the rotational axis in compact motors, etc. FIG. 17 shows a sectional view through a single row ball bearing. In the single row ball bearing shown in FIG. 17, when a single bearing 100 is used, the outer ring 101 freely inclines through an angle of θ on top of ball 102. As a result, when a rotating element (not shown) such as the hub of a spindle motor is mounted on outer ring 101, this rotating element will vibrate in both the axial and radial directions against the inner ring 103, resulting in an unstable rotation.

Similarly, if outer ring 101 is fixed and when a rotating body (not shown) such as the rotational shaft of a spindle motor is mounted on inner ring 103, this rotating body will vibrate in both the axial and radial directions against the outer ring 101, also resulting in an unstable rotation.

Figure 18:
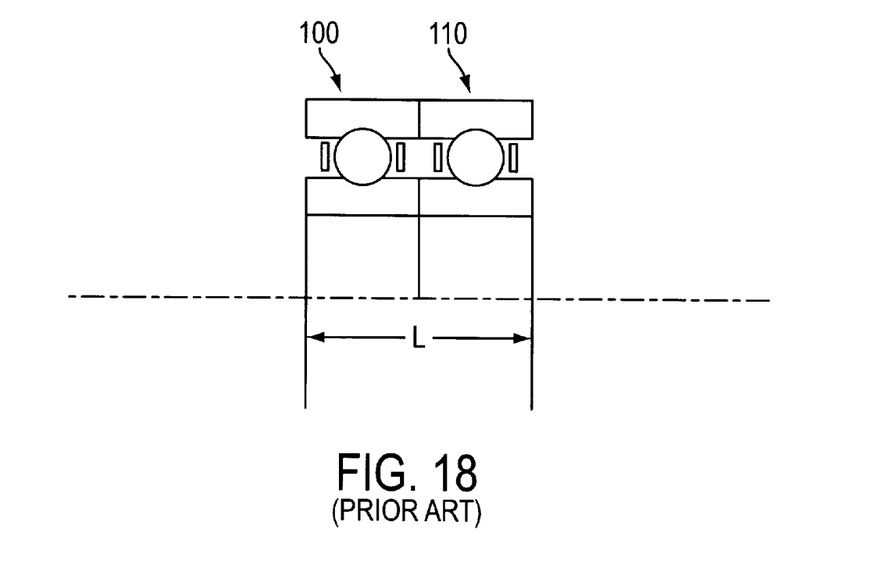
FIG. 18 is a sectional view showing a conventional arrangement of two ball bearings fixed together parallel.
Figure 19:
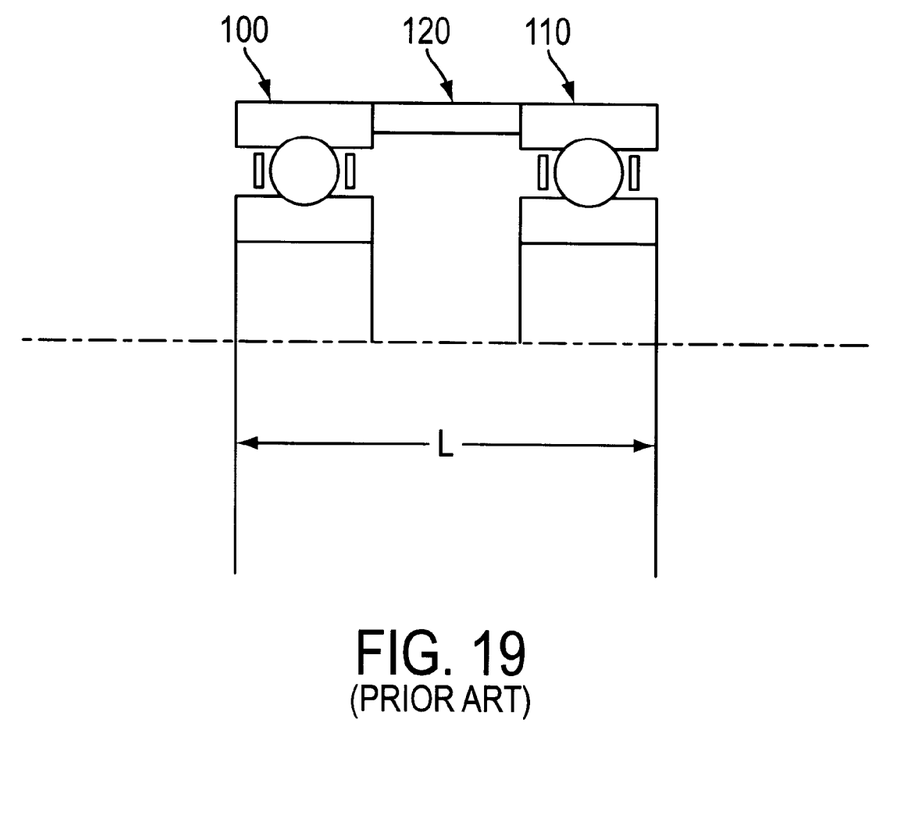
FIG. 19 is a sectional view showing the arrangement of a spacer between conventional ball bearings.

In order to prevent this vibratory rotation of the rotating element, two single row ball bearings 100 and 110 are fixed together in a parallel assembly as shown in FIG. 18, or, to further reduce the rotational vibration, a spacer 120 is mounted between the two single row ball bearings 100 and 110, increasing the space between ball bearing 100 and ball bearing 110, preventing rotational vibration and achieving stable high precision rotation as shown in FIG. 19.

However, in response to the trend for smaller size in many kinds of device, when a rotating element of more compact dimensions is to be employed, it is desired to reduce the dimension L in FIGS. 18 and 19 as much as possible. Accordingly, to make the dimensions as compact as possible, the arrangement is often used as shown in FIG. 18 where single row ball bearings 100 and 110 are mounted side by side, instead of the arrangement where a spacer 120 is used between single row ball bearings 100 and 110 as shown in FIG C. If it is desired to reduce the minimum dimensions even more than this, the only solution is to specially manufacture thin multiple row ball bearings. Even if such special thin multiple row ball bearings are used, the dimensions are limited by the size of the balls in the 2 side-by-side parallel rows.

A concrete example of this trend toward reducing the size of devices is the remarkable recent reduction in the size and thickness of floppy disk drives and hard disk drives for magnetic storage equipment. Demand is especially strong for more compact, thinner spindle motors for use in such drives. To respond to this demand for more compact, thinner spindle motors, a major point is to find some method for making the dimensions of the bearing section more compact (thinner). At present, the only way to meet these requirements is to use a side-by-side double row of ball bearings, or specially produced multiple row ball bearings as mentioned above, and these methods have their limitations. For the bearing on one side of a spindle motor, it is desirable to use a single ball bearing in order to make the motor thinner. However, this method will result in rotational vibration as described above and is therefore not practical. Also, the use of 2 single row ball bearings for this purpose would cause an undesirable cost increase.

The present invention has been accomplished in the light of the above-mentioned problems and it is an object of the invention to provide a bearing structure in which a single ball bearing is used in such a way as to prevent rotational vibration is the same way as if two ball bearings were used, and in addition to provide a low cost, thin type ball bearing structure.

SUMMARY OF THE INVENTION

In order to achieve the above-mentioned object, the invention described in the claims of the present invention provides the means described as follows.

The present invention provides a structure which prevents inclined rotation, using a single-row bearing, which is the minimum for an application of a ball bearing, where sintered, oil-impregnated bearings (or non-oil-impregnated dry bearings or fluid bearings) are arranged on either one side or both sides of either the inner ring or the outer ring of the said single-row bearing.

According to the present invention, the radial load is mainly received by the balls of the single-row bearing, and when the outer or inner ring is about to vibrate and incline, the sintered oil-impregnated bearing at either one side or both sides of either the inner ring or the outer ring, prevents the inclination by slidably contacting the inner or outer ring arranged oppositely at a gap, and since said inner and outer ring form the single-row bearing, their surface is finished very precisely thus reducing frictional loss relating to an inclinational load.

Furthermore, the thrust load is all received by the balls of the single-row ball bearing. In this way, practically the whole of the radial load is received by the balls, the thrust load is also all received by the balls, and the friction loss received by the inclination-preventing sintered, oil-impregnated bearing is very slight, and therefore there is no great influence on either the rotational precision or the lifetime reliability. The present invention makes possible a bearing with minimal width, which can be formed by a composite bearing having an anti-collapse function, and which does not require much increase of the width of the single row ball bearing.

DESCRIPTION OF THE PREFERRED EMBODIMENTS

Embodiments of the present invention will be described in detail below with reference to the accompanying drawings. The basic structure of the composite bearing of the present invention can be divided into two types as follows.

(1): A composite bearing comprising one single row ball bearing and one sintered, oil-impregnated bearing mounted on 1 side hereinafter referred to as a single composite bearing)

This structure will be described in detail with reference to FIGS. 1 to 8.

(2): A composite bearing comprising one single row ball bearing and two sintered, oil-impregnated bearings, one mounted on each side (hereinafter referred to as a double composite bearing)

This structure will be described in detail with reference to FIGS. 9 to 16.

Next, the overall characteristics will be described.
1. Single composite bearing: Because there is only 1 inclination preventing sintered, oil-impregnated bearing on 1 side, this type has production and cost advantages, but with regard to the accuracy of inclination, there are some drawbacks compared to the double type.
2. Double composite bearing: Because there are 2 inclination preventing sintered, oil-impregnated bearings mounted on 2 side, this type has production and cost disadvantages, but it provides better accuracy of inclination compared to the single type.

Next, the detailed structure of each type of composite bearing will be described.

1. Single Composite Bearing

Figure 1:
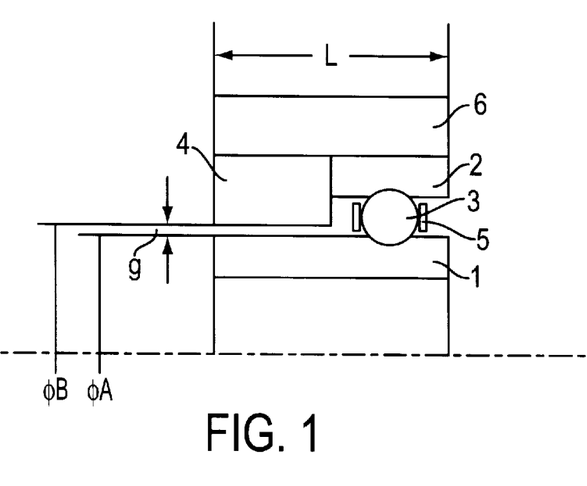
FIG. 1 is a sectional view showing embodiment No. 1 of the present invention, for a single composite bearing.

As shown in FIG. 1, a single composite bearing comprising an inner ring 1, having a width L of the size necessary to restrain the inclination of the axis within the permissible range, and an outer ring 2, having a width which is half the width of the above mentioned width L, which is mounted above the outside half of inner ring 1 and separated from inner ring 1 by a gap. A ball 3 is fitted into this gap between the rings and rests in grooves made in each ring. The balls 3 are prevented from escaping from the groove be retainer 5. As described above, inner ring 1 has a ball groove whose surface is superfinished to high precision in a unitary manner. The outside of outer ring 2 is press fitted into outer ring sleeve 6, which is made of metal having a cylindrical form of width L.

Cylindrically-shaped sintered, oil-impregnated bearing 4 is press fitted into the space formed by the inner parts of outer ring 2, ball 3 and retainer 5. The outer diameter of this sintered, oil-impregnated bearing 4 is the same as the inner diameter of outer ring sleeve 6, and its inner diameter is slightly larger than the outer diameter of inner ring 1. Because of this, sintered, oil-impregnated bearing 4 is press fitted firmly to the inner side of outer ring sleeve 6 and forms a small gap g above the peripheral face of inner ring 1. This inclination restrain gap g, in order to prevent the inclination from exceeding the permitted range, is determined by the dimensions A and B shown in FIG 1, and accordingly extremely high precision processing is required.

During operation of the single composite bearing, if either outer ring 2 or inner ring 1 begins to incline, part of the surface B of sintered, oil-impregnated bearing 4 will contact surface A of inner ring 1 and prevent any further inclination from occurring. The size of the inclination of the axis can be determined by the size of inclination restrain gap g.

Figure 3:
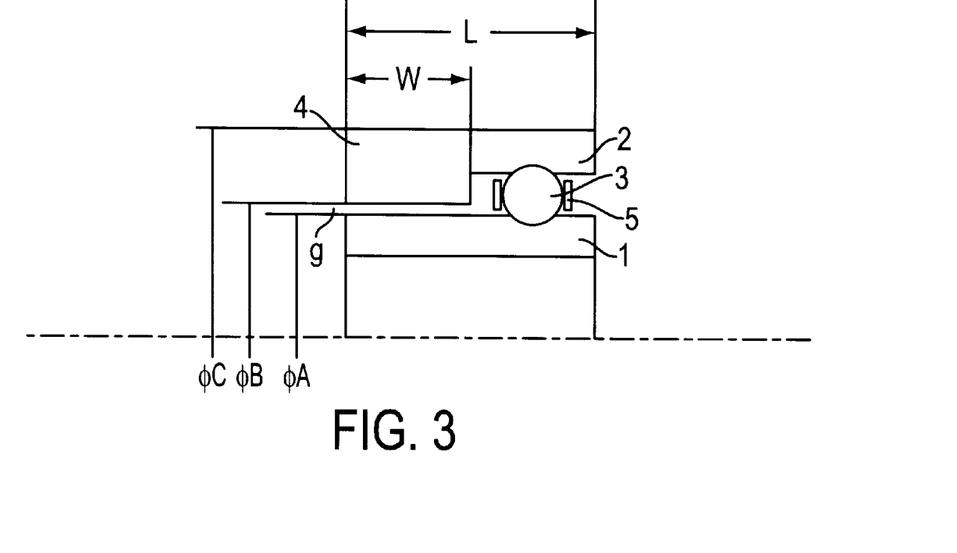
FIG. 3 is a sectional view showing embodiment No. 3 of the present invention, for a single composite bearing.
Figure 5:
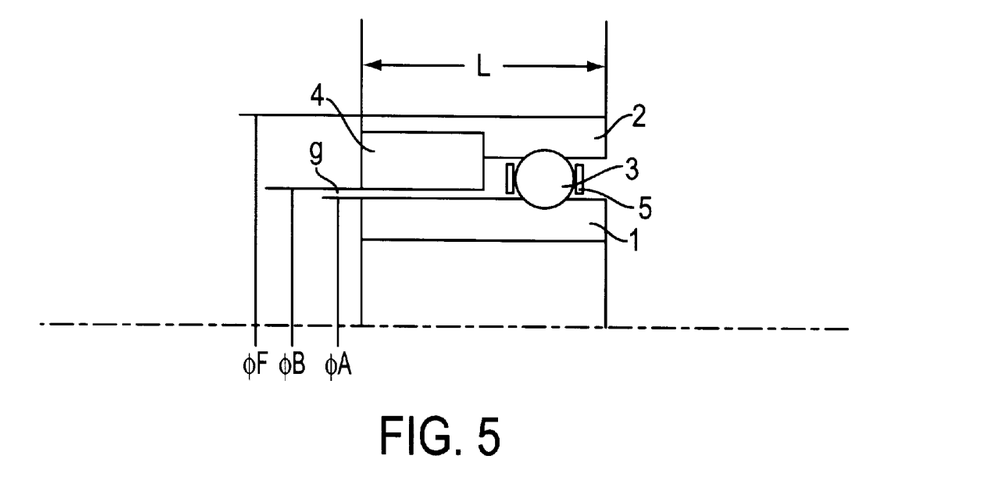
FIG. 5 is a sectional view showing embodiment No. 5 of the present invention, for a single composite bearing.
Figure 7:
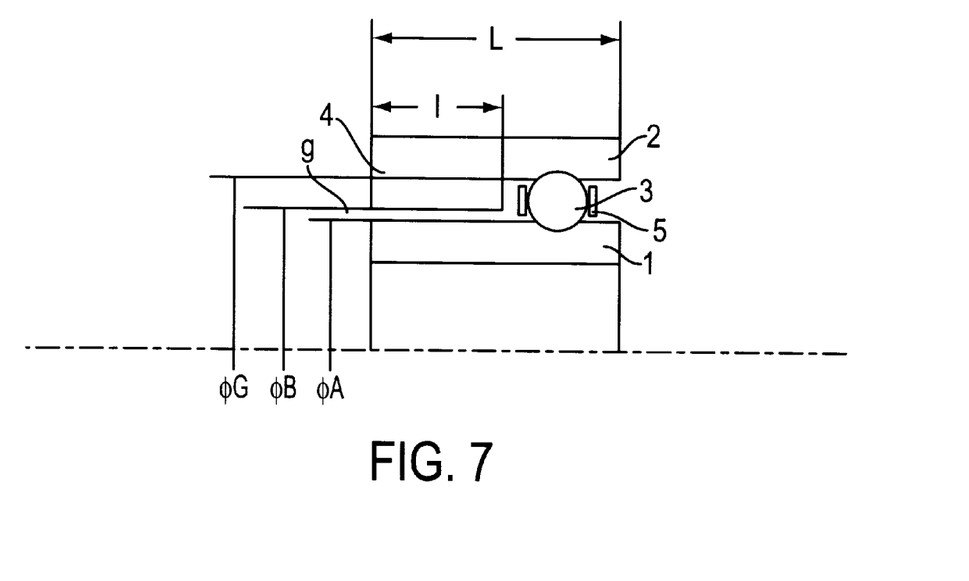
FIG. 7 is a sectional view showing embodiment No. 7 of the present invention, for a single composite bearing.

FIGS. 3, 5 and 7 show basically similar structures to the above, in which a single composite bearing has an inclination restrain gap g formed on the inner ring 1 side. These structures will be described in detail below.

A single composite bearing shown in FIG. 3 has a structure in which the single composite bearing and the inclination restrain gap g are established on the inner ring 1 side. Sintered, oil-impregnated bearing 4, processed to the dimensions outer diameter C, inner diameter B and width W, is combined with a single row ball bearing formed by inner ring 1, outer ring 2, balls 3 and retainer 5. As shown in FIG. 3, there is no outer ring sleeve and instead the outer face of sintered, oil-impregnated bearing 4 is fitted or bonded to the other part in such a way as to maintain inclination restrain gap g.

This embodiment does not require the outer ring sleeve 6 of the embodiment shown in FIG. 1, and instead the parts can be directly assembled together. This embodiment has the advantage of allowing the diametrical dimension to be reduced.

A single composite bearing shown in FIG. 5 has a structure in which the single composite bearing and the inclination restrain gap g are established on the inner ring 1 side. Sintered, oil-impregnated bearing 4 is combined with a single row balls bearing formed by inner ring 1, outer ring 2, ball 3 and retainer 5. Also, outer ring 2 has a stepped large diameter part F, and sintered, oil-impregnated bearing 4 is press fitted or bonded onto this stepped large diameter part F of outer ring 2 to form a structure which, together with inner ring 1, maintains inclination restrain gap g.

In this embodiment, sintered, oil-impregnated bearing 4 is fixed together with outer ring 2 to make a one-piece single composite bearing. This embodiment is easy to use, easy to handle, and does not require an outer ring spacer, and is thus advantageous from the cost viewpoint and because it allows size reductions in the diametrical direction. Also, assembly precision is high.

A single composite bearing shown in FIG. 7 has a structure in which the single composite bearing and the inclination restrain gap g are established on the inner ring 1 side. Sintered, oil-impregnated bearing 4 is combined with a single row balls bearing formed by inner ring 1, outer ring 2, ball 3 and retainer 5. Sintered, oil-impregnated bearing 4 is press fitted or bonded onto the inner diameter part G of outer ring 2 to form a fixed structure which maintains inclination restrain gap g with the dimensions A and B on the inner ring side.

In this embodiment, sintered, oil-impregnated bearing 4 is fixed together with outer ring 2 to make a one-piece single composite bearing, with the outer diameter of inner ring 1 and the inner diameter of outer ring 2 both processes to standard bearing dimensions. This embodiment is easy to use, easy to handle, does not require an outer ring spacer or outer ring step processing, and is thus most advantageous from the cost viewpoint and because it allows size reductions in the diametrical direction. Also, assembly precision is high.

Figure 2:
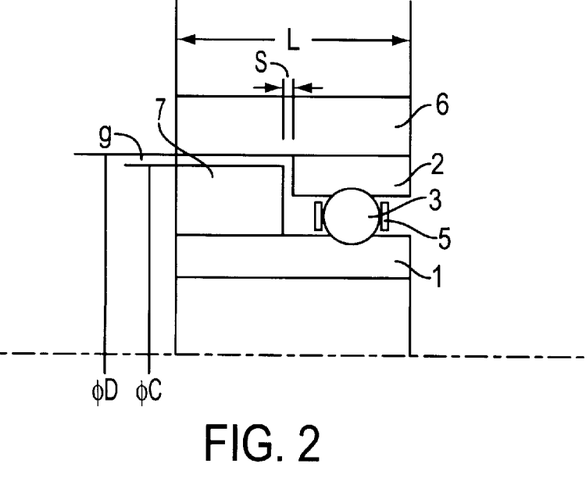
FIG. 2 is a sectional view showing embodiment No. 2 of the present invention, for a single composite bearing.

In another embodiment, as shown in FIG. 2, a single composite bearing comprises an inner ring 1, having a width L of the size necessary to restrain the inclination of the axis within the permissible range, and an outer ring 2, having a width which is half the width of the above mentioned width L, which is mounted above the outside half of inner ring 1 and separated from inner ring 1 by a gap. Balls 3 are fitted into this gap between the rings and rests in grooves made in each ring. The balls 3 are prevented from escaping from the groove be retainer 5. As described above, inner ring 1 has a ball groove whose surface is superfinished to high precision in a unitary manner. The outside of outer ring 2 is press fitted into outer ring sleeve 6, which is made of metal having a cylindrical form of width L.

Sintered, oil-impregnated bearing 7 is arranged in the space formed by the inner parts of outer ring 2, ball 3 and retainer 5. As shown in FIG. 2, this sintered, oil-impregnated bearing 7 has an outer diameter which is smaller than the inner diameter of outer ring sleeve 6, and an inner diameter of the same size as the outer diameter of inner ring 1. Because of this, sintered, oil-impregnated bearing 7 is press fitted firmly to the outer side of inner ring 1 and forms a small gap g with the inner peripheral face of outer ring 2. This inclination suppression gap g, in order to prevent the inclination from exceeding the permitted range, is determined by the dimensions C and D shown in FIG. 2, and accordingly extremely high precision processing is required.

Figure 4:
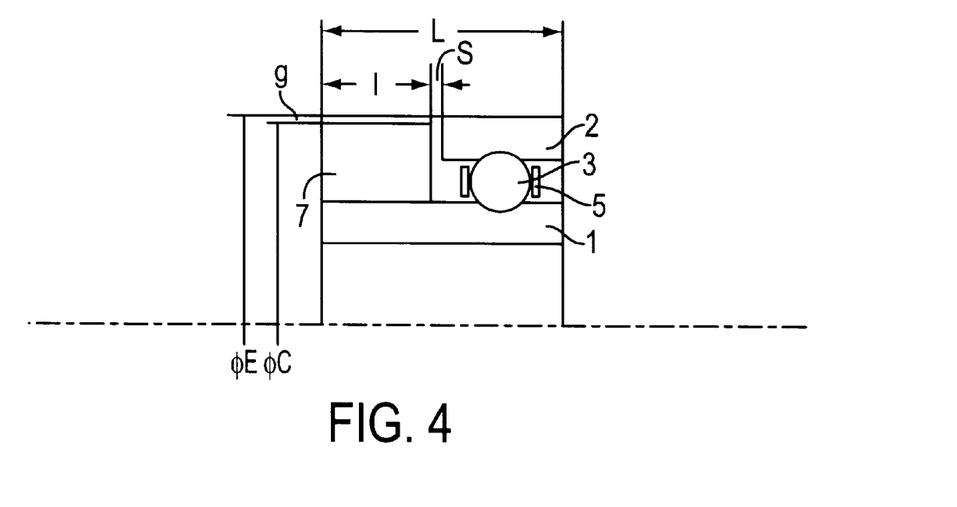
FIG. 4 is a sectional view showing embodiment No. 4 of the present invention, for a single composite bearing.
Figure 6:
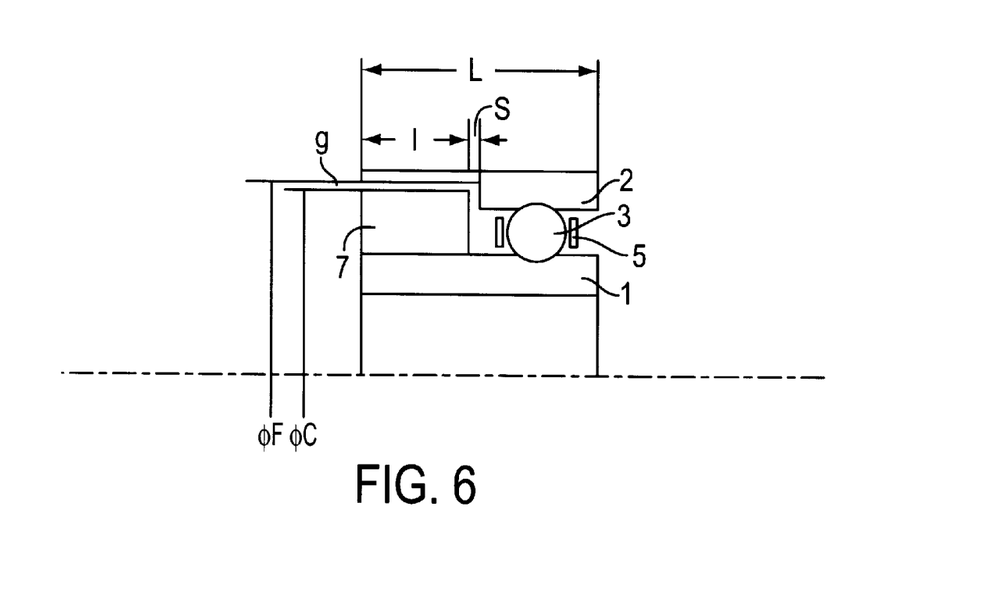
FIG. 6 is a sectional view showing embodiment No. 6 of the present invention, for a single composite bearing.
Figure 8:
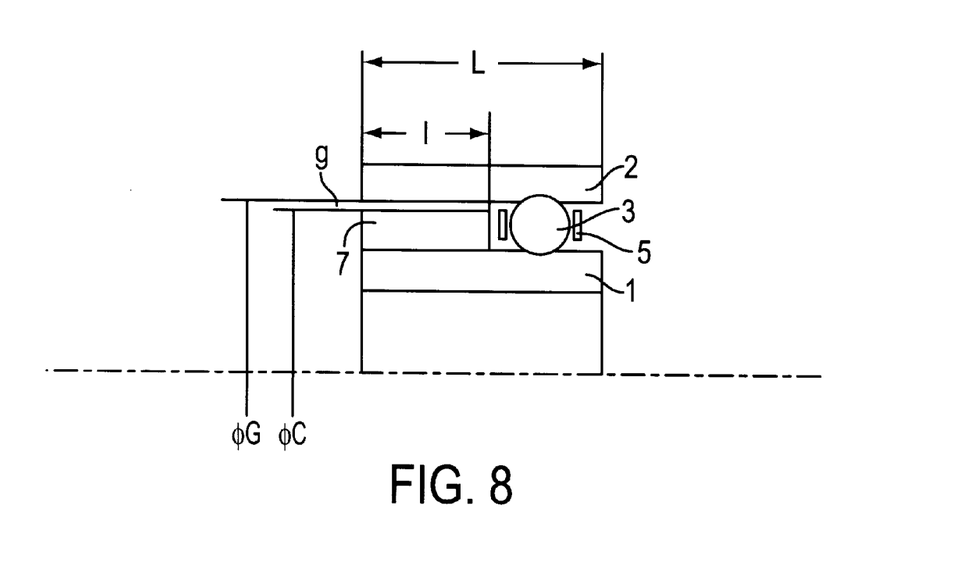
FIG. 8 is a sectional view showing embodiment No. 8 of the present invention, for a single composite bearing.

During operation of the single composite bearing, if either outer ring 2 or inner ring 1 begins to incline, part of the surface C of sintered, oil-impregnated bearing 7 will contact surface D of outer ring sleeve 6 and prevent any further inclination from occurring. The size of the inclination of the axis can be determined by the size of inclination suppression gap g. FIGS. 4, 6 and 8 show basically similar structures to the above, in which a single composite bearing has an inclination suppression gap g formed on the inner ring 1 side. These structures will be described in detail below.

In a single composite bearing shown in FIG. 4, the inclination suppression gap g is established with outer ring 2.

Sintered, oil-impregnated bearing 7, having width I and outer diameter C which forms the specified inclination suppression gap g, is bonded or press fitted to inner ring 1 to make a structure which maintains the gap S with the edge face of outer ring 2.

Outer ring 2 is assembled by bonding or press fitting to inner diameter E of the opposing part, thus forming inclination restrain gap g with inner diameter E of the opposing part.

This composite bearing structure as shown in FIGS. 3 and 4 has the advantage of allowing the diametrical dimension to be reduced.

In the single composite bearing shown in FIG 6, the inclination restrain gap g is established with the side of outer ring 2.

In the single composite bearing formed by inner ring 1, outer ring 2, balls 3 and retainer 5, outer ring 2 has a processed stepped section with large diameter F, and sintered, oil-impregnated bearing 7 is press fitted or bonded onto inner ring 1 to form a structure which maintains inclination restrains gap g with this stepped large diameter part F and also establishes gap S with the edge side of the outer ring.

In this structure, sintered, oil-impregnated bearing 7 is fixed together with inner ring 1 to make a one-piece single composite bearing. This embodiment is easy to use, easy to handle, and does not require an outer ring spacer, and is thus advantageous from the cost viewpoint and because it allows size reductions in the diametrical direction. Also, assembly precision is high.

In a single composite bearing shown in FIG. 8, the inclination restrain gap g is established with the side of outer ring 2.

In the single composite bearing formed by inner ring 1, outer ring 2, ball 3 and retainer 5, sintered, oil-impregnated bearing 7 is press fitted or bonded onto inner ring 1 to form a structure which creates inclination restrain gap g between the inner diameter part G of outer ring 2 and outer diameter part C of sintered oil-impregnated bearing 7.

In this structure, sintered, oil-impregnated bearing 7 is fixed together with inner ring 1 to make a one-piece single composite bearing, with the outer diameter of inner ring 1 and the inner diameter of outer ring 2 both processed to standard bearing dimensions. This structure is easy to use, easy to handle, does not require an outer ring spacer or outer ring step processing, and is thus most advantageous from the cost viewpoint and because it allows size reductions in the diametrical direction. Also, assembly precision is high.

2. Double Composite Bearing

Figure 9:
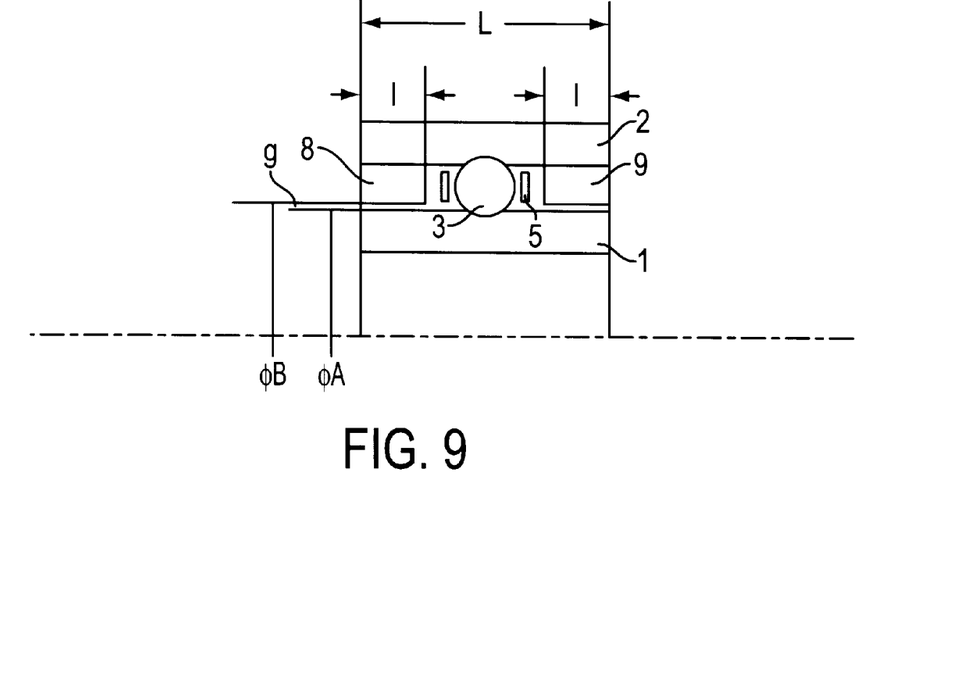
FIG. 9 is a sectional view showing embodiment No. 1 of the present invention, for a double composite bearing.

As shown in FIG. 9, a double composite bearing comprises an inner ring 1, having a width L of the size necessary to restrain the inclination of the axis within the permissible range, and an outer ring 2, having a width which is the same as the above mentioned width L, which is mounted above the outside of inner ring 1 and separated from inner ring 1 by a gap. Balls 3 are fitted into the central space between the two rings and rests in a groove in the outside of inner ring 1 and a groove in the inside of outer ring 2. The balls 3 are prevented from escaping from the ball groove by retainers 5. Inner ring 1 is super finished in one piece to high precision in a shape having the ball groove described above.

Half-sintered oil-impregnated bearings 8 and 9, each having width I, are fitted into the space between inner ring 1 and outer ring 2 on each side of ball 3. The outer diameters of half-sintered oil-impregnated bearings 8 and 9 are the same as the inner diameter of outer ring 2, and their inner diameters are slightly larger than the inner diameter of inner ring 1. Because of this, half-sintered, oil-impregnated bearings 8 and 9 are press fitted firmly to the inner side of outer ring 2 and form a small gap g with the peripheral face of inner ring 1. This inclination restrain gap g, in order to prevent the inclination from exceeding the permitted range, is determined by the dimensions A and B shown in FIG. 9, and accordingly extremely high precision processing is required.

During operation of the double composite bearing, if either outer ring 2 side or inner ring 1 side begins to incline, part of one surface B of half-sintered, oil-impregnated bearings 8 and 9 will contact surface A of inner ring 1 and prevent any further inclination of the axis from occurring. The size of the inclination of the axis can be determined by the size of inclination restrain gap g.

Figure 11:
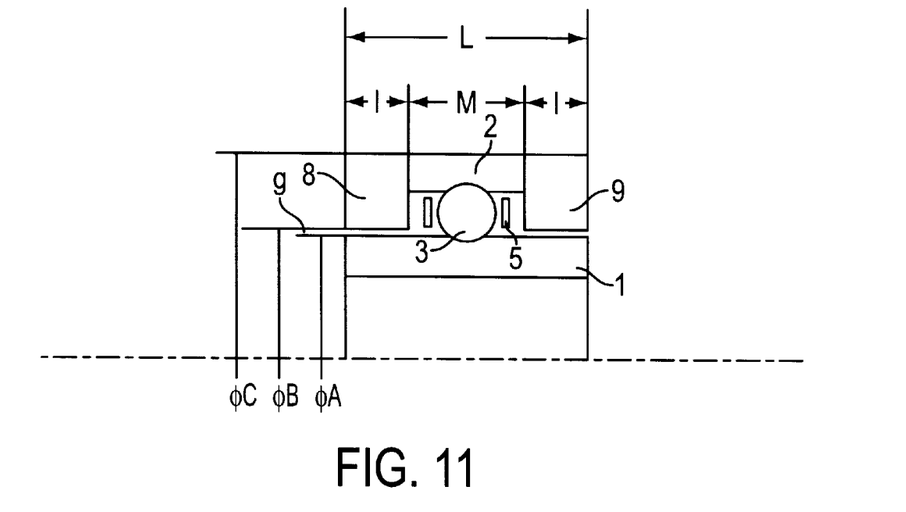
FIG. 11 is a sectional view showing embodiment No. 3 of the present invention, for a double composite bearing.
Figure 13:
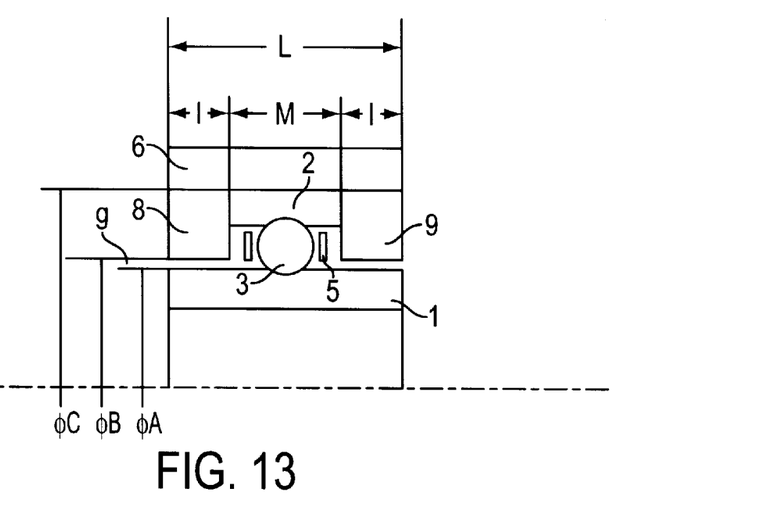
FIG. 13 is a sectional view showing embodiment No. 5 of the present invention, for a double composite bearing.
Figure 15:
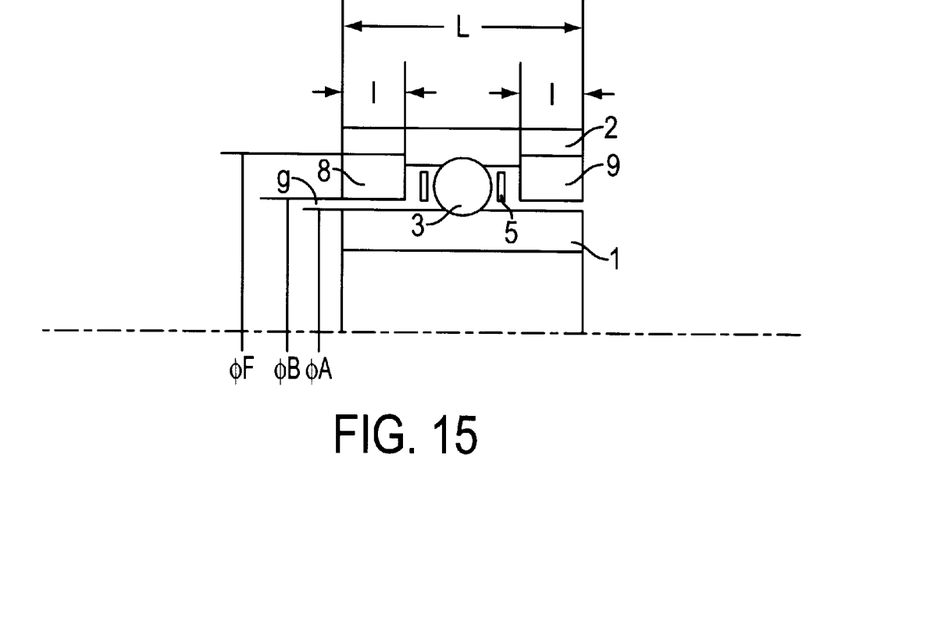
FIG. 15 is a sectional view showing embodiment No. 7 of the present invention, for a double composite bearing.

FIGS. 11, 13 and 15 show basically similar structures to the above, in which a double composite bearing has an inclination suppression gap g formed on the inner ring 1 side. These structures will be described in detail below.

A double composite bearing shown in FIG. 11 has a structure in which the inclination restrain gap g is established on the inner ring 1 side.

Sintered, oil-impregnated bearings 8 and 9, processed to the dimensions outer diameter C, inner diameter B and width L, are press fitted onto either side of outer ring 2 of the single row ball bearing formed by inner ring 1, outer ring 2, ball 3 and retainer 5, thus forming a structure which establishes an inclination restrain gap g on the inner ring 1 side.

In this case, the opposing parts may be freely designed as regards shape, and can be directly assembled together with the opposing parts with no need for an outer sleeve ring 6. This has the advantage of allowing the diametrical dimension to be reduced.

A double composite bearing shown in FIG. 13 has a structure in which the inclination restrain gap g is established on the inner ring 1 side.

Sintered, oil-impregnated bearings 8 and 9, processed to the dimensions outer diameter C, inner diameter B and width L. are press fitted onto the inner diameter part of outer ring sleeve 6 and press onto either side of outer ring 2 of the single row ball bearing formed by inner ring 1, outer ring 2, ball 3 and retainer 5, thus forming a structure which establishes an inclination suppression gap g with outer ring sleeve 6.

In this embodiment, the external diameter of the composite bearing becomes large, but the one-piece structure has the advantages of easy handling and assembly.

A double composite bearing shown in FIG. 15 has a structure in which the inclination restrain gap g is established on the inner ring 1 side.

Sintered, oil-impregnated bearings 8 and 9, processed to the dimensions outer diameter F, inner diameter B and width I, are press fitted onto the inner diameter part of outer ring sleeve 6 and press into the large diameter F sections of either side of outer ring 2 of the single row ball bearing formed by inner ring 1, outer ring 2, ball 3 and retainer 5, thus forming a one-piece structure which establishes inclination restrain gap g with the side of inner ring 1.

In this embodiment, no outer ring sleeve is required and the two sintered, oil-impregnated bearings 8 and 9 are directly assembled together with outer ring 2 as a one-piece assembly, thus offering the advantages of compactness and smaller size in the diametrical direction.

Figure 10:
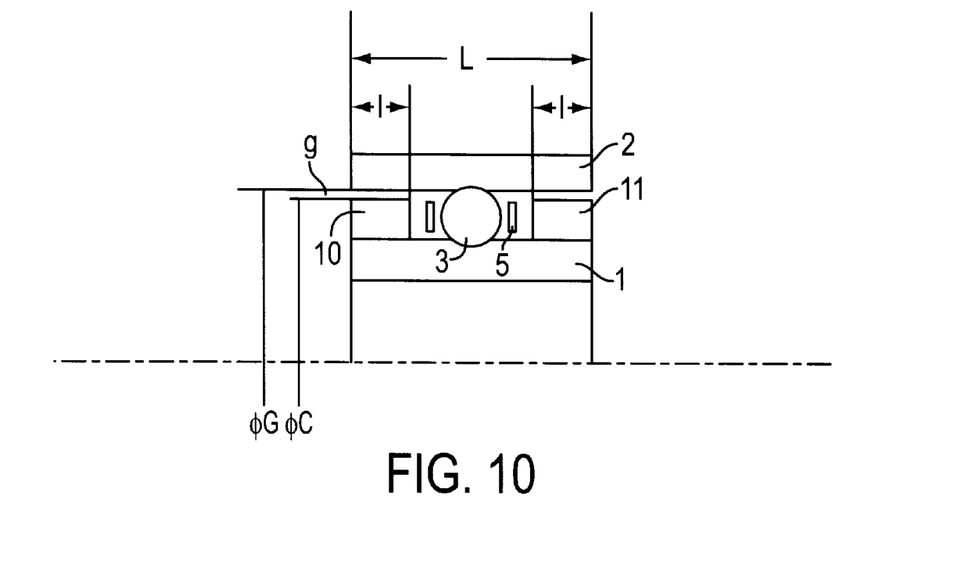
FIG. 10 is a sectional view showing embodiment No. 2 of the present invention, for a double composite bearing.

In a further embodiment as shown in FIG. 10, a double composite bearing comprises an inner ring 1, having a width L of the size necessary to restrain the inclination of the axis within the permissible range, and an outer ring 2, having a width which is the same as the above mentioned width L, which is mounted above the outside of inner ring 1 and separated from inner ring 1 by a gap. Balls 3 are fitted into the central space between the two rings and rests in a groove in the outside of inner ring 1 and a groove in the inside of outer ring 2. The balls 3 are prevented from escaping from the ball groove by retainers 5. Inner ring 1 is super finished in one piece to high precision in a shape having the ball groove described above.

Half-sintered oil-impregnated bearings 10 and 11, each having width I, are fitted into the space between inner ring 1 and outer ring 2 on each side of balls 3. The outer diameters of half-sintered oil-impregnated bearings 10 and 11 are slightly smaller than the inner diameter of outer ring 2, and their inner diameters are the same as the outer diameter of inner ring 1. Because of this, half-sintered, oil-impregnated bearings 10 and 11 are press fitted firmly to the outer side of inner ring 1 and form a small gap g with the inner peripheral face of outer ring 2. This inclination restrain gap g, in order to prevent the inclination from exceeding the permitted range, is determined by the dimensions C and G shown in FIG. 10, and accordingly extremely high precision processing is required.

During operation of the double composite bearing, if either outer ring 2 side or inner ring 1 side begins to incline, part of one surface C of half-sintered, oil-impregnated bearings 10 and 11 will contact surface G of outer ring 2 and prevent any further inclination of the axis from occurring. The size of the inclination of the axis can be determined by the size of inclination restrain gap g.

Figure 12:
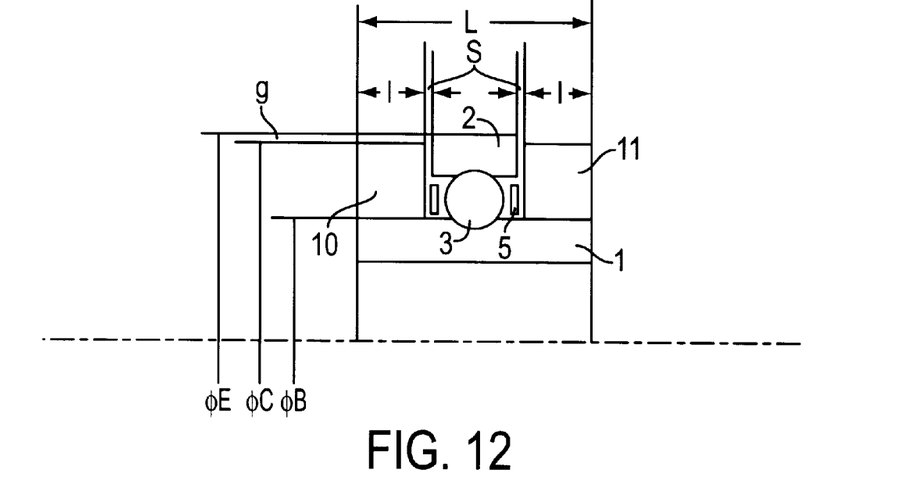
FIG. 12 is a sectional view showing embodiment No. 4 of the present invention, for a double composite bearing.
Figure 14:
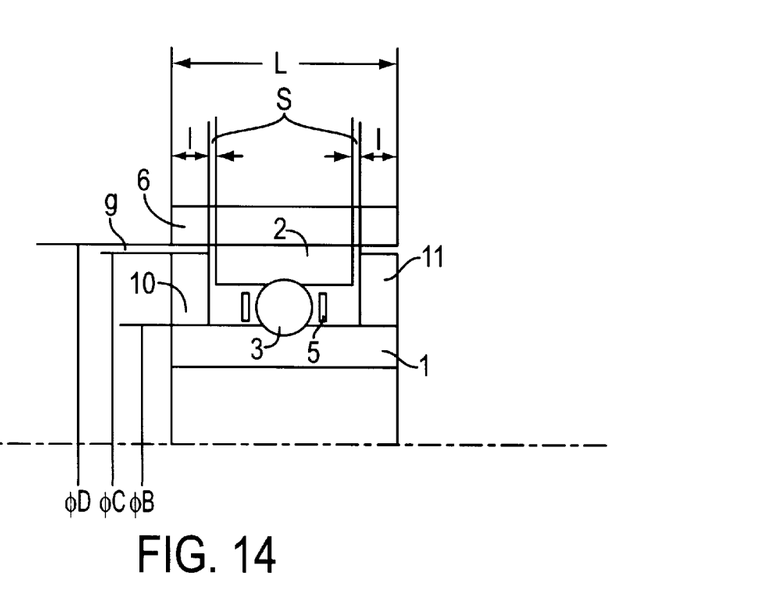
FIG. 14 is a sectional view showing embodiment No. 6 of the present invention, for a double composite bearing.
Figure 16:
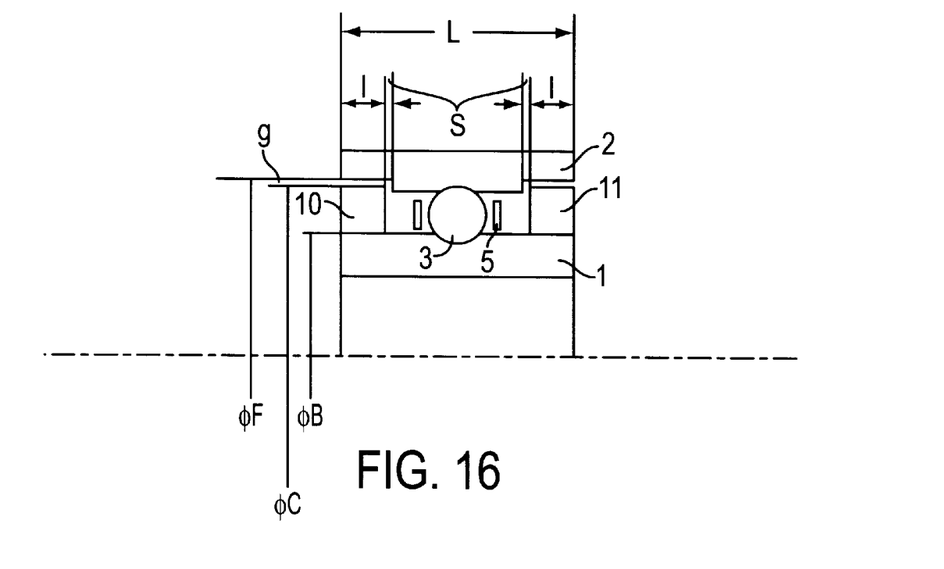
FIG. 16 is a sectional view showing embodiment No. 8 of the present invention, for a double composite bearing.

FIGS. 12, 14 and 16 show basically similar structures to the above, in which a double composite bearing has an inclination restrain gap g formed on the outer ring 2 side. These structures will be described in detail below.

A double composite bearing shown in FIG. 12 has a structure in which the inclination restrain gap g is established on the outer ring 2 side.

Sintered, oil-impregnated bearings 10 and 11, processed to the dimensions outer diameter C, inner diameter B and width L, are press fitted or bonded onto inner ring 1 and mounted, so as to preserve a gap S, on either side of outer ring 2 of the single row ball bearing comprising an inner ring 1, outer ring 2, ball 3 and retainer 5, thus forming a structure which establishes inclination restrain gap g between the opposing parts.

In this case, the assembly is formed as a single piece unlike the set shown in the example of FIG. 14, and so both handling and assembly are easy. Also, the opposing parts may be freely designed as regards shape, and can be directly assembled together with the opposing parts with no need for an outer sleeve ring. This has the advantage of allowing the diametrical dimension to be made more compact.

A double composite bearing shown in FIG. 14 has a structure in which the inclination restrain gap g is established on the outer ring side.

Sintered, oil-impregnated bearings 10 and 11, processed to the dimensions outer diameter C, inner diameter B and width I, are press fitted or bonded onto the outer diameter part of inner ring 1 and mounted, so as to preserve a gap S, on either side of outer ring 2 of the single row ball bearing formed by inner ring 1, outer ring 2, balls 3 and retainer 5, thus forming a structure which establishes inclination suppression gap g with outer ring sleeve 6.

In this embodiment, the outer diameter dimension of the double composite bearing becomes large, but its one-piece construction offers the advantages of easy handling and assembly.

A double composite bearing shown in FIG. 16 has a structure in which the inclination restrain gap g is established on the outer ring 2 side.

Sintered, oil-impregnated bearings 10 and 11, processed to the dimensions outer diameter C, inner diameter B and width I, are press fitted or bonded onto the outer diameter part of inner ring 1 and mounted, so as to preserve a gap S with the stepped faces of outer ring 2, on either side of outer ring 2 of the single row ball bearing formed by inner ring 1, outer ring 2, ball 3 and retainer 5, thus forming a one-piece structure which establishes inclination restrain gap g with the large diameter faces F formed by a step process on outer ring 2.

In this embodiment, no outer ring sleeve 6 is required and the two sintered, oil-impregnated bearings 10 and 11 are directly assembled together with outer ring 2 as a one-piece assembly, thus offering the advantages of compactness and smaller size in the diametrical direction.

The present invention has been described in terms of the above embodiments, but within the range of the gist of this invention various formats and applications are possible. For example, the use of the inner ring 2 as a rotating and stopping axis with no hollow spaces, the use, as a substitute for the sintered, oil-impregnated bearings, of a not included dry bearing (including materials used as fixed bearings such as ceramics, plastics, and others), or a fluid bearing structure, or a magnetic bearing structure, the assembly of a seal plate (seal groove) with this composite bearing. These formats and applications are not excluded from the scope of the present invention.

As explained in detail above, the present invention provides a structure using one single row ball bearing with 1 ball (the smallest unit which can be used in a ball bearing), which, in order to solve the problem of inclination and vibration in the inner and outer rings, uses a sintered, oil-impregnated bearing with the objective of preventing inclination, where an inner or an outer ring of a single row ball bearing is mounted wither on one side or on both sides, in a structure which prevents inclined rotation, and thus provides stable rotational support to the same extent as conventional ball bearings which require a minimum of 2 balls, and in which the bearing can be made thin in the direction of rotational support, and which, because only one ball bearing is required, can be made more inexpensively than conventional bearing structures.

What I claimed is:

1. A composite bearing, which is a combination of a single row ball bearing and a cylindrical bearing, comprising:

inner and outer rings arranged coaxially, each fixed to opposing parts at a certain gap to each other;

a plurality of balls mounted free to roll between opposing grooves on said inner and outer rings; and a cylindrical friction bearing arranged on at least one side of the balls, wherein an inner surface, outer surface, or an end face is fixed to a corresponding component;

wherein the inner or outer surface is opposite another corresponding component, or one of said rings so as to create a predetermined gap that prevents said inner and outer rings from inclining outside a permissible range.

2. A composite bearing according to claim 1, wherein the inner surface is opposite the another corresponding component so as to create the predetermined gap that prevents said inner and outer rings from inclining outside the permissible range.

3. A composite bearing according to claim 1, wherein the outer surface is opposite the another corresponding component so as to create the predetermined gap that prevents said inner and outer rings from inclining outside the permissible range.

4. A composite bearing according to claim 1, wherein said cylindrical friction bearing is arranged by one side of said ball bearing.

5. A composite bearing according to claim 1, wherein said cylindrical friction bearing is arranged on both sides of said ball bearing.

6. A composite bearing comprising:

a ball bearing;

inner and outer rings arranged coaxially to contain said ball bearing;

a cylindrical bearing; and a component opposite to and defining an inclination suppression gap with said cylindrical bearing, wherein the inclination suppression gap prevents said inner and outer rings from inclining outside a permissible range.

7. The composite bearing of claim 6, wherein said outer ring is connected to said component, and said cylindrical bearing is on said inner ring.

8. The composite bearing of claim 6, wherein said ball bearing provides support during use of the composite bearing.

9. The composite bearing of claim 8, wherein said cylindrical bearing provides support during use of the composite bearing.

10. The composite bearing of claim 6, wherein said inner race extends axially between said component and said ball bearing.

11. The composite bearing of claim 6, wherein said inner race and said outer race contain the balls in said ball bearing in opposing grooves.

12. A composite bearing according to claim 6, wherein said cylindrical friction bearing is arranged on both sides of said ball bearing.

13. A composite bearing comprising:

a ball bearing;

inner and outer rings arranged coaxially to contain said ball bearing; and a cylindrical bearing opposite to and defining an inclination suppression gap with said inner ring, wherein the inclination suppression gap prevents said inner and outer rings from inclining outside a permissible range.

14. The composite bearing of claim 13, further comprising a component, wherein said cylindrical bearing and said outer ring are attached to said component.

15. The composite bearing of claim 13, wherein said ball bearing provides support during use of the composite bearing.

16. The composite bearing of claim 15, wherein said cylindrical bearing provides support during use of the composite bearing.

17. The composite bearing of claim 13, wherein said inner race extends axially between said component and said ball bearing.

18. The composite bearing of claim 13, wherein said inner race and said outer race contain the balls in said ball bearing in opposing grooves.

19. A composite bearing according to claim 3, wherein said cylindrical friction bearing is arranged on both sides of said ball bearing.

* * * * *